July 1, 1947.  L. L. ASPELIN  2,423,281

RELIEF VALVE

Filed Dec. 2, 1943

INVENTOR.
LESLIE L. ASPELIN
BY
ATTORNEYS

Patented July 1, 1947

2,423,281

UNITED STATES PATENT OFFICE 2,423,281

RELIEF VALVE

Leslie L. Aspelin, Elyria, Ohio, assignor to Romec Pump Company, Elyria, Ohio, a corporation of Ohio Application December 2, 1943, Serial No. 512,552

10 Claims. (Cl. 277—61)

This invention relates to relief valves and/or relief and by-pass valves and is illustrated and described in a form adapted for use with a pump such as a fuel or transfer pump.

It is among the objects of my invention to provide a relief valve of improved efficiency both from the point of view of its operation as well as from its size, economy of material and cost of production. Another object is to provide a relief valve having a high relation of capacity in respect to the area of the closure and is sensitive and responsive to the pressure intended to be relieved. Another object is to provide a relief valve that is responsive to a wide range of selected fluid pressures for its intended responses without the concomitant and usual disadvantage of an excessively large spring or resilient means and/or without the disadvantage of a rapid build up and change of resistance in a smaller spring. A further object is to provide a relief valve structure in which a by-pass valve may be economically and advantageously combined. A further object is to provide a relief valve of large capacity in relation to the exposed actuated area and adjustable resistance. A further object is to provide a compact and efficient relief and by-pass valve suitable for use with a small rotary fluid pump such as a fuel or transfer pump of high capacity.

Figure 1:
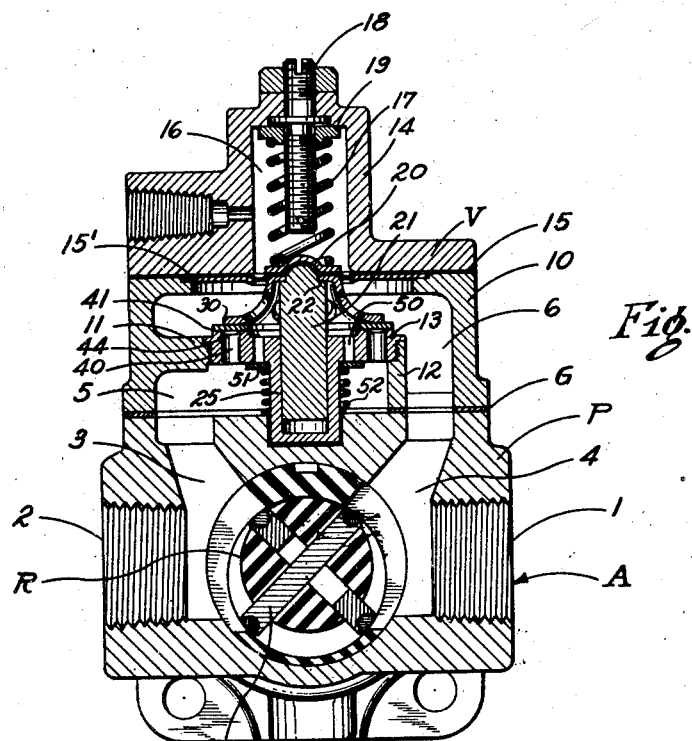
Figures 2, 3:
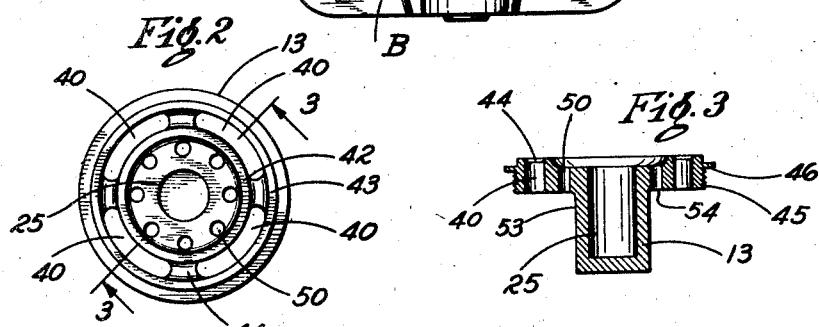
Figures 4, 5:
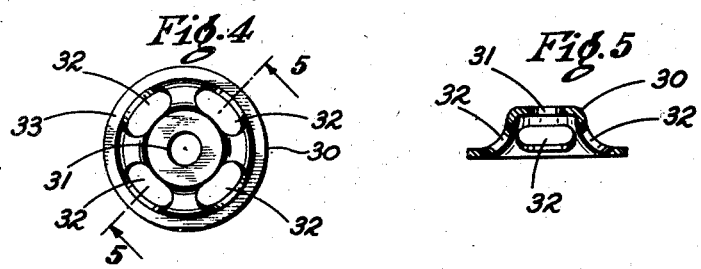

Other objects and advantages will appear from the following description of a preferred form of my invention, reference being had to the accompanying drawings in which Fig. 1 is a vertical median sectional view taken in the plane of the axis of the relief valve containing my invention and transversely of the pump with which it is associated; Fig. 2 is a plan view of the valve seat or seats of the relief and by-pass valves; Fig. 3 is a transverse section taken along the lines 3—3 of Fig. 2; Fig. 4 is a plan view of the valve cage of the relief valve and Fig. 5 is a transverse section taken along the lines 5—5 of Fig. 4.

Referring particularly to Fig. 1, the relief and by-pass valve with its body and associated parts V is illustrated as mounted upon and in operating relation to a rotary pump P. The valve is shown in this association by way of example of one useful environment in which it may be employed advantageously. For illustration the pump P may be regarded as having an intake 1 and discharge 2 through which fluid is normally intended to flow in the direction of the arrow A as the same is induced by rotation of the rotor R and the movement of blades B as is well known. In the normal operation of such a pump the discharge side of the pump will embrace fluids at high pressure as in the chamber 3, and the intake side of the pump will contain fluid at a lower pressure in the chamber 4; the relief valve V normally controlling the flow of fluid from the chamber 3 to the chamber 4 to maintain a desired pressure in the chamber 3. In conjunction with such operation of the pump P or corresponding instrumentality, the relief valve has what is ordinarily the high pressure chamber 5 and low pressure chamber 6, each freely communicating with the corresponding chambers 3 and 4 respectively. When the valve is called upon to function as a by-pass valve it will be assumed that the fluid pressure exerted in the chamber 6 exceeds the pressure in the chamber 5 in which event it is then desired that fluid be permitted to flow from the chamber 6 to the chamber 5 as will be more fully described below. Considering the valve V as a relief valve, it may be assumed that the pressure in the chamber 5 is sought to be maintained in determinable excess of atmospheric or other pressure in the spring chamber 16. In the exemplary installation shown, the valve V and the pump P are held together by means not shown and mutually engage a sealing gasket G which seals off the chambers 3 and 5 on one hand from the chambers 4 and 6 on the other hand.

The valve V in the preferred form herein illustrated and described comprises a body 10 which may be of generally cylindrical form containing the chambers 5 and 6 and also having partition walls such as 11 and 12 which support the valve seat 13 and with the valve closure members separate the chamber 5 from the chamber 6.

Above the body 10 is disposed a head or cap member 14 mechanically attached to the body 10 in fluid tight relation thereto and which with the body 10 supports a flexible, preferably continuous preformed, diaphragm 15 which affords fluid separation between the chamber 6 of the body 10 and the chamber 16 of the cap 14. The chamber 16 above the diaphragm 15 may be bled to atmosphere or connected with a source or point of fluid pressure, the influence of which is sought to be exerted upon the upper side of the diaphragm 15 in opposition to the pressure in the chamber 6 to influence the opening and closing of the valve as is the common practice in modern airplane usage where supercharger pressure instead of atmospheric pressure is maintained in the chamber 16. Within the chamber 16 is also disposed a spring 17 which may be adjustably compressed through the screw 18 and the nut 19, the nut being free to move axially but held against rotation, to exert an adjustable downward pressure on the free mid section of the diaphragm 15 through a suitably formed centering washer 20. A centrally apertured plate 15' supported at its peripheral edge in a counterbore of the top face of the body 10 underlies the annular mid portion of the diaphragm 15 and defines the effective area of the exposed central part of the diaphragm adjacent the washer 20. Axially aligned with the spring 17 and lying coaxially of the valve seat 13 is disposed the valve stem or guide member 21, the extreme upper end of which may be rounded complementarily to the washer 20 to retain a concentric relation therewith, and the lower portion of the stem or guide 21 may have a free sliding fit in the well-like or dash pot portion 25 of the seat 13 and be guided therein in its upward and downward movement under the influence of the spring 17, diaphragm 15 and the valve cage 30, see also Fig. 5. The valve cage 30 is preferably disposed below the central movable portion of the diaphragm 15 and has its upper annular part juxtaposed to the washer 20 around the upper end of the stem 21 which end preferably protrudes through the aperture 31 of the cage 30 and into a central dimple in the diaphragm. The cage 30 rests on and is preferably secured to the annular shoulder 22 of the stem 21 as by brazing between appropriate materials whereby the cage 30, the mid portion of the diaphragm, the washer 20 and the stem 21 move in axially aligned vertical motion as viewed in Fig. 1. The cage member 30 is somewhat conically formed, see Figs. 4 and 5, has a plurality of side ports 32, and terminates in its lower-most portion in an annular ring-like part 33 which substantially overlies the main valve ports 40 in the seat 13. The part 33 preferably has its lower surface in a plane truly normal to the axis of the stem 21.

Secured to the lower face of the annular part 33 of the cage 30 is the valve closure member 41 which takes the form of a flat ring or annulus engageable with the narrow spaced annular ribs 42 and 43, see Fig. 2, of the valve seat member 13. The annular ribs 42 and 43 may be more accurately defined as the seats proper of the relief valve. When the closure member 41 bears upon and has sealing contact with the ribs or seats 42 and 43, passage through the ports 40 is closed. As shown in Figs. 2 and 3, the parts of the seat member 13 which space the ports circumferentially as at 44 are depressed slightly, see also Fig. 1, whereby to expose the whole of that portion of the undersurface of the member 41 what lies between the annular seats 42 and 43 to the pressure of the chamber 5 when the valve is closed. The closure member 41 is carried by the valve cage 30 and raised and lowered with it and may be secured thereto in any suitable manner as by brazing when the parts are made of brass or by other suitable means adapted to materials employed. Thus if the closure member 41 is rubber or rubber-like it may be vulcanized to a metallic cage 30 along the co-extensive annular surfaces.

Preferably the seat member 13 is a separately formed part as shown in Figs. 2 and 3 having a fluid tight screw threaded engagement with the inner partition walls of the body 10 and being threaded as at 45 below a flanged shoulder 46. Appropriate sealing means may be used adjacent the flange 46 to enhance a fluid tight joint. As above mentioned the seat member 13 also preferably contains a guide well 25 in its central part receiving and guiding the stem 21. Where it is desired to combine a by-pass valve in the same structure with the relief valve I have found it advantageous and desirable to provide a plurality of by-pass ports 50 in the zone radially between the inner rib or seat 42 and the well 25, see Figs. 2 and 3; the ports being circumferentially spaced around this part of the seat member whereby to be conveniently closed by an annular closure member or washer 51, see Fig. 1, urged upwardly as viewed in Fig. 1 by a spring 52 and guided in its vertical motion coaxially of the member 13 by its sliding fit with the exterior cylindrical wall 53 of the well or guide portion 25 of the seat 13. Preferably the portions of the seat which lie circumferentially between the by-pass ports 50 are milled away as at 54 so that the whole annular face of the closure member 51 within the radial displacement of the ports 50 is exposed to the fluid pressure of the chamber 6 while flow through the ports 50 is closed with the closure member or washer 51 in its uppermost position. So long as the pressure in the chamber 5 taken with the action of the spring 52 exceeds the effect of the pressure in the chamber 6, the valve 51 acts merely as a check valve, closing the ports 51. When the pressure in the chamber 6 exceeds that in the chamber 5 sufficiently to overcome the spring 52 the valve 51 acts as a by-pass valve.

In the operation of the device embodying my invention, the annular area between the seats 42 and 43 is much smaller than the whole circular area within the seat 43 but includes all of the effective flow area of prior poppet valves which had the whole circular area of the seat 43. My invention therefore approximately eliminates that portion of total area of conventional poppet valves which was not effective to flow, but was effected by static pressure and impact pressures. Elimination of this portion of the area not affective to flow allows the use of a lower load rate spring for a given length as at 17. This in turn allows the valve 11 to move farther away from the seat for a given rise in pressure in the chamber 5, and so results in better pressure regulation. Moreover my valve provides two peripheries of fluid escapement, one inwardly past seat 42 and through openings 32 into the chamber 6, one outwardly past seat 43 directly into the same chamber. This double exit also provides substantially double room for liquid escapement for a given rise and results in better pressure regulation. The area of valve opening, up to the area of the ports 41, is measured by the sum of the peripheries of both the seats 42 and 43 multiplied by the lift. The result is that for a given lift I obtain approximately twice the area of valve opening that is obtained in the poppet type relief valve. I reduce the build-up in the spring 17 to approximately one half that required in a comparable poppet type valve for the same capacity. All of these things coact advantageously and complementarily. The net effective diaphragm area is small since it approximates only the area between the seats 42 and 43 less a desirable differential area to load the spring 17. Similarly the amount of flexing, i. e., wear and tear, of the diaphragm is much reduced with the reduction in the requirement for lift in relation to net valve opening.

The advantages flowing from my invention include a substantially constant pressure regulation with the use of a relatively small and light spring and diaphragm in view of the reduced build-up of the spring and reduced flexing, and build-up, in the diaphragm. In the same way all of the parts are reduced in size, because I employ them more effectively and efficiently, and the relative smallness and efficiency of the parts is reflected in proportionate savings in material weight and cost as well as in the desirably improved performance and operation of the device. While I have illustrated and described a preferred form of my invention in one illustrative environment, modifications, changes, equivalents and improvements will occur to those skilled in the art without departing from the precepts and teachings hereof nor from the spirit of my invention, and I do not desire to be limited to the preferred form nor to any specific form nor in any manner other than by the claims appended hereto.

I claim:

1. In a valve the combination of concentric radially spaced annular seats disposed in a plane normal to and coaxial with the axis of the valve, means obstructing the flow of fluid through said valve other than between said seats, a ring-like closure member coacting with said seats and movable axially in respect thereto, a dash pot having its wall parallel to the axis of the valve coaxial thereof, a stem received in said dash pot and movable axially thereof and guided by the wall thereof, perforate conically shaped means connecting said stem and said closure member, a flexible diaphragm overlying the end of said stem having an effective area closing the opening of said valve smaller than the area of the larger of said seats, and resilient means urging said diaphragm into operative contact with said stem and urging said closure member into contact with said seats.

2. The combination according to claim 1 in which said diaphragm is centrally dimpled and in which the end of said stem is rounded and received in said dimple, and a dimpled washer interposed between said resilient means and said diaphragm oppositely of said stem and receiving the dimpled portion of said diaphragm.

3. In a valve the combination of concentric radially spaced annular seats disposed in a plane normal to and coaxial with the axis of the valve, means obstructing the flow of fluid through said valve other than between said seats, a ring-like closure member coacting with said seats and movable axially in respect thereto, a dash pot having its axis in the axis of said valve and having a wall coaxial thereof, a ported valve cage carrying said closure member, a stem received in said dash pot and movable axially thereof and guided by the wall thereof, said stem carrying said cage, a flexible diaphragm having an effective area smaller than the area of the larger of said seats and overlying the end of said stem and a portion of said cage, and resilient means urging said diaphragm into operative contact with said stem and said cage and urging said closure member into contact with said seats.

4. A valve seat containing member having a pair of radially spaced concentric seats on each of opposite parallel faces thereof, the pair of seats on one face spanning an outer annular ported area and the pair of seats on the opposite face spanning an inner annular ported area, said member also having a hollow central coaxial cup like cylindrical extension open at one face of said member and extending axially away from the other face of said member within the area of the smaller of said seats, said extension being adapted to receive and guide closure means for one pair of seats interiorly thereof and guide closure means for the other pair of seats exteriorly thereof.

5. In a valve the combination of a seat containing member having a pair of radially spaced concentric seats on each of opposite parallel faces thereof, the pairs of seats spanning respectively radially spaced concentric ported areas, said member also having a centrally disposed hollow coaxial cylindrical part, annular closure members coacting respectively with said pairs of seats on opposite sides of said first named member and movable axially thereof, said cylindrical part guiding both said closure members for separate axial motions, one member having internal and the other having external sliding guided contact therewith.

6. A valve comprising a high pressure chamber, a low pressure chamber, a ported partition between said chambers, a base pressure chamber between which and said high pressure chamber a substantially constant pressure differential is sought to be maintained, a flexible diaphragm between said low pressure chamber and said base pressure chamber having an exposed area subjected on opposite sides to the pressures in said chambers and movable in response to the effect thereof, said partition having a pair of concentric annular seats on the side of said low pressure chamber delineating an annular ported area therebetween, an annular closure member coacting with said seats and movable in said low pressure chamber to control the flow of fluid past said seats, means exerting substantially constant pressure urging said closure member to contact said seats, means connecting the movable part of said diaphragm with said closure member, the said effective area of said diaphragm being less than the area of said partition between said seats, and means coacting with the portion of said partition within the area of the smaller of said seats for guiding said closure member in its movement with respect to said seats.

7. A valve comprising a high pressure chamber, a low pressure chamber, a ported partition between said chambers, a base pressure chamber between which and said high pressure chamber a substantially constant pressure differential is sought to be maintained, a flexible diaphragm between said low pressure chamber and said base pressure chamber having an exposed area subjected on opposite sides to the pressures in said chambers and movable in response to the effect thereof, said partition having a pair of concentric annular seats on the side of said low pressure chamber delineating an annular ported area therebetween, an annular closure member coacting with said seats and movable in said low pressure chamber to control the flow of fluid past said seats, means including said diaphragm exerting substantially constant pressure urging said closure member to contact said seats, and perforate means connecting the movable part of said diaphragm with said closure member, the said effective area of said diaphragm being less than the area of said partition within the larger of said seats.

8. A valve comprising a high pressure chamber, a low pressure chamber, a ported partition between said chambers, a base pressure chamber between which and said high pressure chamber a substantially constant pressure differential is sought to be maintained, a flexible diaphragm between said low pressure chamber and said base pressure chamber having an exposed area subjected on opposite sides to the pressures in said chambers and movable in response to the effect thereof, said partition having a pair of concentric annular seats on the side of said low pressure chamber delineating an annular ported area therebetween, an annular closure member coacting with said seats and movable in said low pressure chamber to control the flow of fluid past said seats, means exerting substantially constant pressure urging said closure member to contact said seats, perforate means connecting the movable part of said diaphragm with said closure member, said partition also having ports radially inward of said seats, and means disposed in said high pressure chamber for controlling the flow through said last named ports.

9. A valve comprising a high pressure chamber, a low pressure chamber, a ported partition between said chambers, a base pressure chamber between which and said high pressure chamber a substantially constant pressure differential is sought to be maintained, a flexible diaphragm between said low pressure chamber and said base pressure chamber having an exposed area subjected on opposite sides to the pressures in said chambers and movable in response to the effect thereof, said partition having a pair of concentric annular seats on the side of said low pressure chamber delineating an annular ported area therebetween, an annular closure member coacting with said seats and movable in said low pressure chamber to control the flow of fluid past said seats, means exerting substantially constant pressure on said diaphragm urging said closure member to contact said seats, and perforate means connecting the movable part of said diaphragm with said closure member, the said effective area of said diaphragm opposing the opening of said valve being not substantially greater than the area between said seats.

10. A valve comprising a high pressure chamber, a low pressure chamber, a ported partition between said chambers, a base pressure chamber between which and said high pressure chamber a substantially constant pressure differential is sought to be maintained, a flexible diaphragm between said low pressure chamber and said base pressure chamber having an exposed area subjected on opposite sides to the pressures in said chambers and movable in response to the effect thereof, said partition having a pair of concentric annular seats on the side of said low pressure chamber delineating an annular ported area therebetween, an annular closure member coacting with said seats and movable in said low pressure chamber to control the flow of fluid past said seats, means exerting substantially constant pressure on said diaphragm urging said closure member to contact said seats, means connecting the movable part of said diaphragm with said closure member, the said effective area of said diaphragm being less than the area of said partition between said seats, and means coacting with the portion of said partition within the area of the smaller of said seats for guiding said closure member in its movement with respect to said seats.

LESLIE L. ASPELIN.

REFERENCES CITED

The following references are of record in the file of this patent:

UNITED STATES PATENTS

| Number | Name | Date |
|---|---|---|
| 2,271,497 | Newell | Jan. 27, 1942 |
| 1,876,938 | Horne | Sept. 13, 1932 |
| 1,217,747 | Graham | Feb. 27, 1917 |
| 1,909,974 | Longacre | May 23, 1933 |
| 783,528 | Kipp | Feb. 28, 1905 |

FOREIGN PATENTS

| Number | Country | Date |
|---|---|---|
| 488,668 | Great Britain | 1938 |